3,804,850
METHOD OF PREPARING 1,5-DISUBSTITUTED-2-HALOIMIDAZOLES
John Martin, Wayland and Francis Johnson, Newton Lower Falls, Mass., assignors to The Dow Chemical Company, Midland, Mich.
No Drawing. Filed Oct. 25, 1972, Ser. No. 300,741
Int. Cl. C07d 49/36
U.S. Cl. 260—309  2 Claims

ABSTRACT OF THE DISCLOSURE

Various 1,5-disubstituted-2-haloimidazoles are prepared employing a three step method which involves cyclizing a substituted α-cyanoaminonitrile to a substituted 2-halo-4-aminoimidazole followed by diazotization of the amino group and the subsequent deamination of the thus formed diazonium salt. The 1,5-disubstituted-2-haloimidazoles are intermediates useful for preparing 1,5-disubstituted-2-nitroimidazoles which are useful anti protozoal agents.

SUMMARY OF THE INVENTION

The present invention is directed to the preparation of 1,5-disubstituted-2-haloimidazoles corresponding to the formula

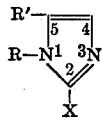

In this and succeeding formulae, X represents chlorine or bromine; R represents methyl, ethyl and R' represents methyl, ethyl, n-propyl or isopropyl. The 1,5-disubstituted-2-haloimidazoles of the present invention are prepared in a three step synthesis method which can be carried out in one reaction vessel without separation of the products of each step. The method comprises first cyclizing a substituted α-cyanoaminonitrile to a substituted 2-halo-4-amino imidazole hydrohalide followed by diazotization of the substituted-2-halo-4-aminoimidazole hydrohalide to the diazonium salt which is thereafter deaminated to the desired 1,5-disubstituted-2-haloimidazole.

This sequence of steps can be characterized by the following reaction scheme

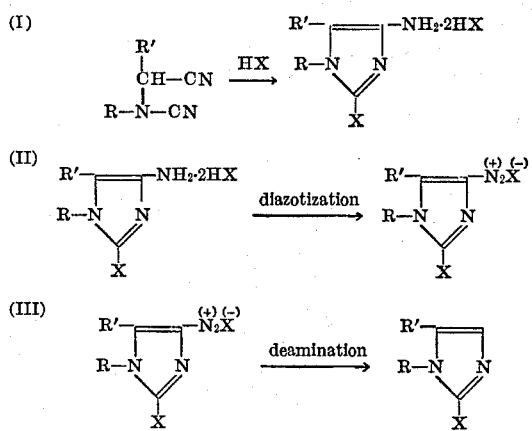

wherein R, R' and X are as hereinbefore defined. (No attempt has been made to provide balanced equations.)

The compounds prepared by the present invention have been found to be intermediate in the preparation of 1,5-disubstituted-2-nitroimidazoles which have exceptional activity in the control of protozoal organisms. This activity is discussed by G. Lancini et al., J. Med. Chem., vol. 12 (1969), pp. 775–780.

In carrying out the preparation steps, an appropriately substituted α-cyanoaminonitrile is cyclized to the 1,5-disubstituted-2-halo-4-aminoimidazole by slowly adding the nitrile reagent to an agitated solution of the appropriate hydrogen halide in glacial acetic acid at a temperature of from about 0° to about 50° C. This step and subsequent steps can be carried out utilizing atmospheric pressure. The reaction mixture is maintained under agitation for a period of from 15 to 25 hours. Thereafter, methylene chloride is added to the reaction mass and the mixture cooled to about minus 20° C. It is important that the methylene chloride be added prior to the cooling step so that the acetic acid present does not freeze. A saturated aqueous solution of sodium nitrite is slowly added to the reaction mixture at a rate such that the temperature of the reaction is maintained between about minus 30° and minus 15° C. The 1,5-disubstituted-2-disubstituted-2-halo-4-aminoimidazole hydrohalide product contained therein being diazotized by the sodium nitrite. Upon completion of the sodium nitrite addition, an aqueous hypophosphorous acid solution which deaminates the diazonium salt hereinbefore formed is slowly added to the reaction mixture at a rate such that the temperature of the reaction is maintained between about minus 30° and minus 15° C. The mixture is maintained under agitation until the evolution of nitrogen ceases (usually in about 1 to 3 hours). The mixture is thereafter neutralized at a temperature below minus 15° C. with a base such as sodium hydroxide or potassium hydroxide. The reaction mixture is thoroughly extracted with methylene chloride and the combined extracts are washed with water and dried. Any solids present are removed by filtration. The solvent is removed by evaporation under reduced pressure and the product is recovered by distillation.

DESCRIPTION OF SOME PREFERRED EMBODIMENTS

In order that the present invention can be more fully understood, the following examples are given by way of illustration and should not be construed as limitations upon the overall scope of the same.

EXAMPLE I 1-methyl-2-bromo-5-isopropylimidazole

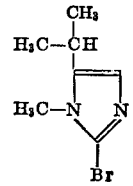

To an agitated solution comprising ~150 grams of hydrogen bromide in ~350 grams of glacial acetic acid at 0° C. was added dropwise over one hour, 68.5 grams of α-(N-methyl-N-cyano)aminoisovaleronitrile. Precipitation of a white solid began after addition was completed. The resulting mixture was maintained under agitation for 20 hours. To this agitating mixture was added 300 milliliters of methylene chloride and the mixture was cooled to minus 20° C. To this mixture was added dropwise over a forty minute period, a saturated aqueous solution of sodium nitrite (46 grams of sodium nitrite to 100 milliliters of water) while the temperature was maintained at between minus 20° and minus 15° C. Thereafter 330 milliliters of 50 percent hypophosphorous acid was added dropwise over one hour while the temperature was maintained at between minus 20° and minus 15° C. The mixture was maintained under agitation for an additional two hours and neutralized by dropwise addition of concentrated sodium hydroxide while the mixture was agitated and cooled. Three hundred milliliters of methylene chloride was added to the mixture and the organic layer separated. The non-organic phase was further extracted twice with 200 milliliter portions of methylene chloride and the extracts were combined with the organic layer. The extract mixture was washed twice with 100 milliliter portions of water and dried over anhydrous magnesium sulfate. The solvent was removed by evaporation under reduced pressure leaving a brown oil residue. The residue was distilled to yield 63 grams (62 percent of theory) of 1-methyl-2-bromo-5-isopropylimidazole as a product. The product was a colorless mobile liquid having a boiling point of 97°–98° C. at 0.7 millimeter of mercury. Upon analysis, the product was found to have, carbon, hydrogen, nitrogen and bromine contents of 42.02, 5.56, 14.05 and 38.29 percent, respectively, as compared with the theoretical contents of 41.40, 5.46, 13.79 and 39.35 percent, respectively, calculated for the above named structure.

In an analogous manner employing generally the method of Example I and the appropriate substituted α-cyanoaminonitrile and hydrogen halide, the following compounds are prepared.

1-methyl-2-chloro-5-isopropylimidazole;
1-methyl-2-chloro-5-n-propylimidazole;
1-methyl-2-chloro-5-methylimidazole;
1-methyl-2-bromo-5-ethylimidazole;
1-ethyl-2-bromo-5-methylimidazole;
1-ethyl-2-chloro-5-ethylimidazole;
1-ethyl-2-bromo-5-n-propylimidazole; and
1-ethyl-2-bromo-5-isopropylimidazole.

It has been found that the novel compounds of the present invention are especially useful intermediates in the preparation of 1,5-disubstituted-2-nitroimidazoles. In general, the preparation of the appropriate 1,5-disubstituted-2-nitroimidazoles is achieved by reacting an appropriate 1,5-disubstituted-2-haloimidazole with a loweralkyl or aryl lithium compound, i.e., methyllithium, ethyllithium, butyllithium or phenyllithium in the presence of an ether or hydrocarbon solvent stable to the lithium compound at a temperature of minus 75° to minus 30° C. and thereafter adding said mixture to a solution of dinitrogen tetroxide in a solvent such as, for example, hexane or cyclohexane at the same temperature. Thereafter, the mixture is allowed to warm to room temperature. The desired 1,5-disubsituted-2-nitroimidazole product is thereafter recovered by conventional techniques of solvent extraction and crystallization. The utility of the 1,5-disubstituted-2-nitroimidazoles is discussed in Lancini et al. as hereinbefore set forth.

PREPARATION OF STARTING MATERIALS

The substituted α-cyanoaminonitrile starting material of the formula

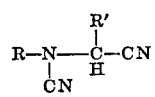

wherein R is methyl or ethyl and R' is as hereinbefore defined are known compounds and can be prepared by the methods taught in U.S. Pat. 2,743,291 wherein an appropriately substituted aminonitrile is reacted with cyanogen chloride or bromide under alkaline conditions in an inert solvent at room temperature to 50° C. These compounds can also be prepared as taught in U.S. Pat. 3,261,873 wherein a cyanamide is reacted with an alkyl cyanide having a reactive alpha substituent in the presence of a base.

What is claimed is:

1. A method for preparing a 1,5-disubstituted-2-haloimidazole compound corresponding to the formula

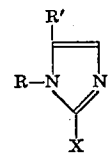

wherein R represents methyl or ethyl; R' represents methyl, ethyl, n-propyl or isopropyl and X represents chlorine or bromine which comprises reacting a substituted α-cyano-aminonitrile corresponding to the formula

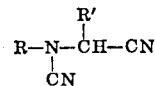

wherein R and R' are as hereinabove defined with a hydrogen halide in glacial acetic acid at a temperature of from about 0° to about 50° C.; treating the resulting reaction mixture with a saturated aqueous sodium nitrite solution at a temperature of from minus 30° to minus 15° C. and adding to the reaction mixture an aqueous hypophosphorous acid solution and thereafter recovering the desired 1,5-disubstituted-2-haloimidazole as a product.

2. The method of claim 1 wherein substituted α-cyano-aminonitrile employed is α-(N-methyl-N-cyano)aminoisovaleronitrile and the product produced is 1-methyl-2-bromo-5-isopropylimidazole.

References Cited
UNITED STATES PATENTS
3,261,873   7/1966   Johnson et al. _____ 260—309

OTHER REFERENCES

Fieser et al.: Advanced Organic Chemistry, pp. 734–6, New York, Reinhold, 1961.

Hofmann: Imidazole and Its Derivatives, part I, pp. 142–3, New York, Interscience, 1953.

Grimmett in: Katritzky et al. Advances in Heterocyclic Chemistry, p. 181, New York, Academic, 1970.

NATALIE TROUSOF, Primary Examiner

U.S. Cl. X.R.

260—141, 999

PO-1050
(5/69)

UNITED STATES PATENT OFFICE
CERTIFICATE OF CORRECTION

Patent No. 3,804,850          Dated April 16, 1974

Inventor(s) John Martin and Francis Johnson

It is certified that error appears in the above-identified patent and that said Letters Patent are hereby corrected as shown below:

Column 2, lines 19 and 20, cancel the phrase "2-disubstituted-";

Signed and sealed this 5th day of November 1974.

(SEAL)
Attest:

McCOY M. GIBSON JR.
Attesting Officer

C. MARSHALL DANN
Commissioner of Patents